United States Patent [19]
Kondo

[11] 3,884,266
[45] May 20, 1975

[54] DIRECTIONAL-CONTROL VALVE

[76] Inventor: Shigeji Kondo, 5-1 Sakuma Takeya-cho, Gamagori-shi, Aichi-ken, Japan

[22] Filed: Apr. 12, 1973

[21] Appl. No.: 350,374

[30] Foreign Application Priority Data
Apr. 17, 1972 Japan.............................. 47-37748

[52] U.S. Cl............................. 137/625.27; 251/362
[51] Int. Cl............................................ F16k 11/00
[58] Field of Search....... 137/625.27, 625.5, 625.43, 137/625.68, 625.26, 625.64, 625.63, 625.66, 269, 315; 251/360, 367, 359, 362, 363

[56] References Cited
UNITED STATES PATENTS

| | | | |
|---|---|---|---|
| 2,574,096 | 11/1951 | Fischer et al. | 137/625.27 X |
| 2,910,081 | 10/1959 | Karbowniczek | 137/625.68 |
| 3,202,170 | 8/1965 | Holbrook | 137/625.5 X |
| 3,283,784 | 11/1966 | Ruchser | 137/625.26 X |
| 3,329,159 | 7/1967 | Herion | 137/625.63 X |
| 3,329,165 | 7/1967 | Lang | 137/625.5 |
| 3,384,122 | 5/1968 | Harpman | 251/367 X |
| 3,587,156 | 6/1971 | Sorenson | 137/625.66 X |
| 3,680,593 | 8/1972 | Sorenson | 137/625.64 X |
| 3,739,811 | 6/1973 | Gross | 137/625.27 |

*Primary Examiner*—Martin P. Schwadron
*Assistant Examiner*—Robert J. Miller
*Attorney, Agent or Firm*—Burgess Ryan & Wayne

[57] ABSTRACT

A directional-control valve for fluid power control systems, particularly pneumatic-power control systems, which includes a plurality of pairs of valve-seat members which are made of resilient material and arranged coaxially in a row within a valve-body, and also includes a poppet-spool including a rod and a plurality of poppets which are arranged between the seat members of each pair. The axial movement of the poppet-spool makes the poppets simultaneously open one, and close the other seat member of each pair. The valve-construction of the present invention provides s short valve-stroke and easy valve-operation. The resilient valve-seat member provides long valve-life and also reliable sealing, which results in accurate directional-control.

9 Claims, 8 Drawing Figures

DIRECTIONAL-CONTROL VALVE

BACKGROUND OF THE INVENTION

1. Field of the Invention

The present invention relates to a directional-control valve for fluid-power control systems, particularly pneumatic-power control systems.

2. Description of the Prior Art

The directional-control valve, poppet-type valve and spool-type valve are widely used. In the poppet-valve, one or more poppets are arranged at the pressure side, with respect to a valve-seat, so that the poppet can be kept in firm contact with the seat by the pressure applied to the poppet. However, said pressure acts as a back pressure or resisting force when the valve is operated to open the flow-passage and, therefore, the poppet must be actuated by an operating force greater than said back-pressure. For example, in a solenoid-operated valve, the solenoid must be very large in order to quickly operate the valve. Actuating the poppet by a greater operating force, the poppet or a valve rod impacts against the related stopper means. This hammering causes the destruction of the poppets, the valve rod, or the stopper means. Further, a multi-way, for example a four-way, poppet-type valve is very complex in structure, because of the necessity of providing it with a valve-body having complicated flow-passages, and a number of poppet and rod pairs.

The spool-valve is provided with a spool which slides in a sleeve or valve-body to open and close the flow-passages between the flow-ports. In this valve, metal-to-metal seals or O-ring seals are used for tight sealing of the spool and the sleeve. However, metal-to-metal seals must be constructed with very little tolerance in their measurements. O-ring seals cause very large frictional resistance between the spool or sleeve and the O-ring and, therefore, the spool must be actuated by an operating force greater than the frictional resistance. The spool-valve also is objectionable in that metal-to-metal seals and O-ring seals are damaged by foreign particles, for example minute metal pieces, in a fluid flow, which causes a lowering of their sealing ability, and; that lack of lubrication at the slide way causes gall and heat-seizure. Further, the spool-valve requires a long spool-stroke to completely exchange the direction of the flow, and thus the operating time of the valve is longer in comparison with the poppet-valve.

SUMMARY OF THE INVENTION

It is an object of the present invention to provide a new directional-control valve for fluid-power control systems, particularly pneumatic-power control systems, which has a plurality of advantages.

In accordance with the preferred embodiments, a valve of the present invention includes a valve-body, which is provided with a substantially cylindrical chamber and a number of flow-passages which are connected to the chamber through flow-ports. These flow-ports are arranged along the longitudinal surface of the chamber. The valve also includes a number of valve-seat members which are disposed in said chamber and coaxially arranged in a row parallel to the axis of the chamber. The seat members are made of a resilient and self-lubricating material, and each includes an annular wall portion. The peripheral surface of the wall portion is closely in contact with the inner side surface of the valve body, whereby said flow passages are connected to one another only through the seat members. Further, the valve includes a poppet-spool, having a rod and plurality of metal-poppets secured to said rod, and means for supporting the poppet-spool so as to be coaxial with the seat members and axially slidable. The poppets are arranged between the seat members of each pair, whereby the seat members of each pair are alternately opened and closed by the poppets when the poppet-spool is axially actuated, and thus the direction of fluid-flow is controlled.

The supporting means comprises a pair of support members which are made of a resilient and self-lubricating material. Each member includes an annular wall portion being closely in contact at its peripheral surface with the valve-body, and other annular portion being closely in contact with the rod of the poppet-spool at the peripheral surface thereof. Said other annular portion can be flexibly displaced with said rod, when a radial force is applied to the rod.

The invention, and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

Figure 1:
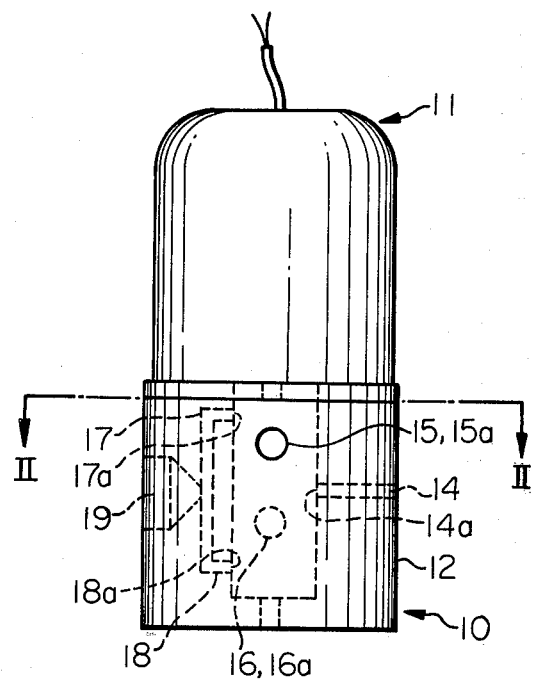
FIG. 1 is a simplified elevational-view of a solenoid-operated directional-control valve which is an embodiment of the present invention.

A directional-control valve 10 shown in FIG. 1 is a two-position, four-way valve. This valve 10 is operated by solenoid 11.

Figure 2:
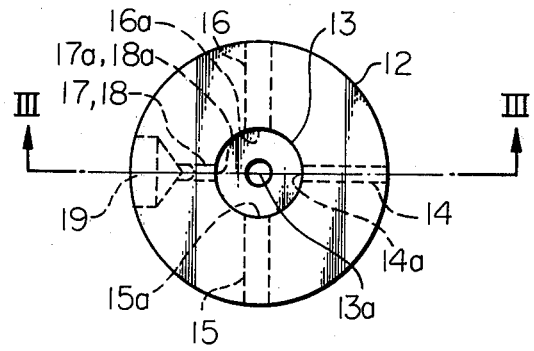
FIG. 2 is a plan view of a valve-body, taken along line II—II in FIG. 1.

As shown in FIG. 1 and FIG. 2, the valve 10 includes a cylinder-formed valve-body 12 with a cylindrical chamber 13 and flow-passages 14 – 18, connected to the chamber 13. The flow-passage 14 is used as the pressure passage, and is connected to a pressurized-air source. The passages 15 and 16 are used as the first and second supply passages, and are connected to, for example, a pneumatic-power double-acting cylinder. The passages 17 and 18, are exhaust passages, and are vented to the atmosphere through a common port 19. These flow-passages 14 – 18, are connected to the chamber 13 through flow-ports 14a – 18a respectively. The flow-ports 14a – 18a, are positioned on the surface of the chamber 13, namely the inner side surface of the valve-body 12, in the following arrangement. As will be understood from FIG. 1, the flow-ports 14a – 18a are so arranged that there is space between the five horizontal planes, each of which passes through the center of one of the flow-ports 14a – 18a, and all of which are perpendicular to an axis 13a of chamber 13. The center of the port 14 is on the middle plane of said five planes. The centers of the ports 17a and 18a are on the uppermost and lowermost planes, respectively, and the centers of the ports 15a and 16a are on the planes between the middle and uppermost planes, and between the middle and lowermost planes, respectively. Furthermore, as will be understood from FIG. 2, the centers of the flow ports 14a, 17a, 18a, are on one vertical plane which passes through the axis 13a, and; the centers of the flow-ports 15a and 16a, are on another vertical plane which passes through the axis 13a and which is perpendicular to said one vertical plane.

Figure 3:
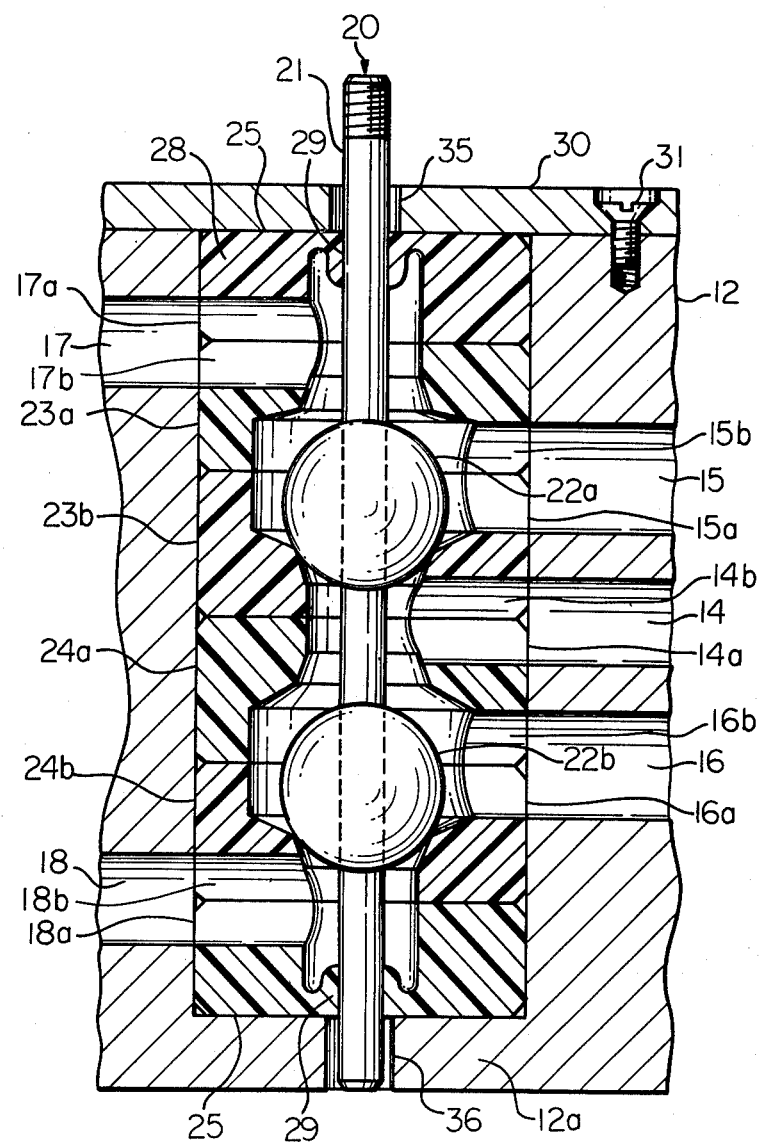
FIG. 3 is an axial sectional-view taken along the line III—III in FIG. 2, showing in detail the main portion of the valve, although the all of flow-passages are shown on the same plane for convenience.

As shown in detail in FIG. 3, the valve 10 includes a poppet-spool 20, two pairs of seat members 23a, 23b, 24a, 24b, and a pair of support members 25 for supporting the poppet-spool 20, which are all coaxially disposed within the chamber 13. The poppet-stool 20 includes a rod 21, and two steel ball-formed poppets 22a and 22b which are axially spaced and secured to the rod 21 for movement therewith.

Figure 4:
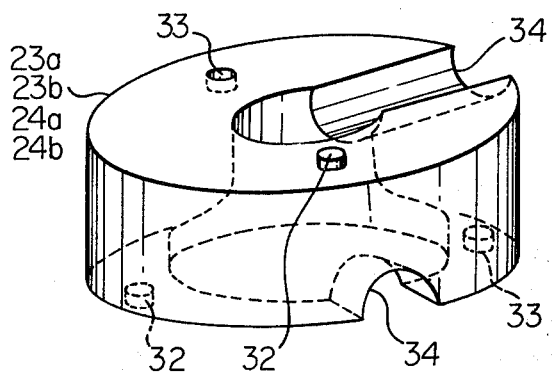
FIG. 4 is a perspective view of a valve-seat member as shown in FIG. 3.

The valve-seat member 23a, 23b, 24a and 24b are moulded into the same shape, as shown in FIG. 4, and are of a resilient and self-lubricating material, such as molybdenum disulfide-mixed nylon, teflon, urethane, lubricant-mixed rubber, or the like. Each seat member has an annular wall portion 26, and a seat portion having a circular contact-edge 27 formed at inner side of the wall portion 26, as shown best in FIG. 5. As shown in FIG. 4, the seat member is also formed at each end surface with two semicylinder-formed grooves 34 extending radially, a projection 32, and a hole 33. The two grooves 34 of each seat member are arranged so that the vertical planes passing through their respective centers are 90° apart. The projection 32 and the hole 33 of each end surface are so arranged that a line running through the centers of each is perpendicular to the axis of the seat members as well as of the respective groove 34.

The support members 25 are moulded of the resilient and self-lubricating material described above, and each has an annular wall portion 28, and an annular supporting portion 29, as shown in FIG. 3. Each support member 25 is also formed at one end surface with a groove, a projection, and a hole, which are similar to the groove 34, the projection 32, and the hole 34, respectively, of the seat member.

In FIG. 3, the support members 25 are disposed at the opposite end of the chamber 13, and the seat members 23a, 23b, 24a, 24b are arranged in a row between the support members 25 in such a manner that the seat members are axially reversed in attitude one after the other so as to be arranged into two pairs. These seat members and support members are securely installed by means of a cover 30, which is fastened to the valve body 12 with screws 31 or the like. In this arrangement, these members are in contact with each other at the end surfaces of their wall portions 26 and 28, two adjacent grooves 34 of the seat members and support members are brought into alignment to form cylindrical ports 14b – 18b which are connected to the flow-ports 14a – 18a, respectively. In FIG. 3, the flow-passages and the flow-ports 15, 16 and 15b, 16b, respectively, are shown on one plane for convenience. Said alignment of the grooves 34 is easily achieved by engaging the projections 32 of the adjacent members to the holes 33.

The seat members and support members preferably undergo axial compression effected by the cover 30 and the bottom portion 12a of the valve body 12. Therefore, these members, moulded of the resilient material, are deformed slightly in the both the axial and radial directions, and these deformations bring them closely into contact at their peripheral surfaces with the inner side surface of the valve-body 12. Thus, the flow-passages 14 – 18, are connected to the chamber 13 only through the flow-ports 14b–18b, of the seat members.

The rod 21 of the poppet-spool 20 is supported by the supporting portions 29 of the support members. The supporting portions 29 are closely in contact with the rod 21, and permit the rod 21 to axially slide. Further, the supporting portion 29 is radially displaced when a radial force effects the rod 21, and therefore, the rod 21 can be freely displaced in the radial direction. The upper end of the rod 21 projects through an opening 35 of the cover 30. This upper end is threaded and thereby screwed into an armature (not shown) of the solenoid assembly 11. The lower end of the rod 21 projects into an opening 36 in the bottom portion of the valve-body 12. The diameters of said openings 35 and 36 are equal, and are larger than the diameter of the rod 21, whereby the rod 21 can be freely displaced in the radial direction.

The poppet 22a is arranged between the seat member 23a and 23b, and the poppet 22b is arranged between the seat member 24a and 24b. The diameter of the poppets 22a, 22b is somewhat larger than the same of the contact edge 27 of the seat member. The axial distance between the centers of poppets 22a, 22b is equal to the distance, along the axis of rod, between the contact edges 27 of the upper seat member 23a, 24a, and lower seat member 23b, 24b, of each pair. Therefore, poppets 22a, 22b can both be brought simultaneously into contact with said contact edges 27 of said upper and lower seat members, alternately. The distance between the extreme upper and lower positions of the poppet-spool 20 is the "valve-stroke."

The operation of this valve is as follows. In FIG. 3, it is assumed that the solenoid 11 is deenergized, and the poppet-spool 20 is held at the extreme lower position by means of a return-spring within the solenoid 11. In this position, the lower seat members 23b and 24b of each pair are closed airtight, and the upper seat members 23a and 24a are opened. Thus the pressure passage 14 is connected to the supply passage 16 through the seat member 24a, and the supply passage 15 is connected to the exhaust passage 17. When the solenoid 11 is energized, the poppet-spool 20 is moved upward and maintained at its extreme upper position. In this position, the upper seats 23a and 24a of each pair are closed airtight, and the lower seats 23b and 24b of each pair are opened. Thus pressure passage 14 is connected to the supply passage 15 through the seat 23b, and supply passage 16 is connected to the exhaust passage 18.

Obviously, from the above, the valve according to the present invention consists of a few kinds of individually unified parts, particularly, the seat members molded of the resilient and self-lubricating material. These resilient seat members eliminate the necessity for O-rings, or the like, to attain air-tight sealing with the valve-body, and also are allowed to have relatively large manufacturing tolerances. Therefore, the valve can be simplified in construction and also can be miniaturized. Further, the total cost can be lowered as compared to the prior art.

Figure 5:
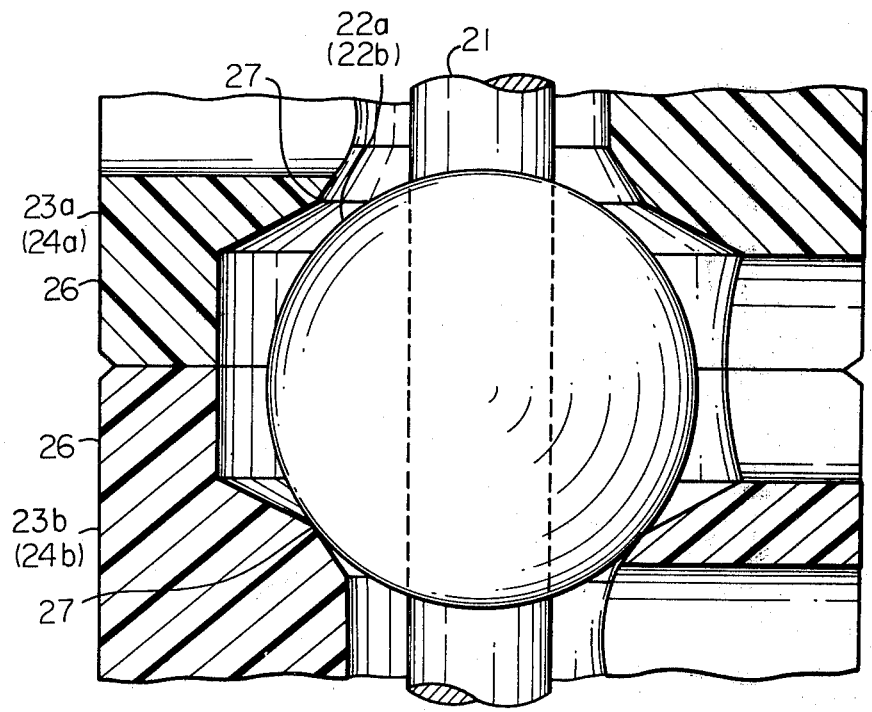
FIG. 5 is an enlarged-view of a part of FIG. 3, showing a poppet and valve-seat members.

As shown in detail in FIG. 5, the poppet 22a (or 22b) comes into contact with contact edge 27 of the seat member. This contact is reliable, and also substantially uniform over all of its length because of the resiliency of the contact edge 27, even if there are relatively large manufacturing errors in poppet and seat member measurements. If the axes of the seat member and the poppet are not in alignment, only a part of the contact edge is deformed by the poppet, and the deformed part applies an elastic reaction force toward the axis of the poppet. In this case, the rod 21 supported by the flexible portions of the support members 25 is displaced radially to a balanced neutral position to make the poppet and the contact edge come closely into contact over all of the contact edge. Further, if foreign particles, for example minute metal pieces conveyed by the air flow, are caught between the poppet and contact edge, only limited portions of the contact edge 27, are elastically deformed. Therefore, both the poppet and the contact edge are not damaged, and the sealing effect is maintained for a long period of time.

In the present valve, the "valve-stroke" is very short because of employing the poppet, and therefore, it is possible to control the flow-direction quickly. Since the poppet does not slide with respect the seat member, failures such as "gall" or "heat-seizure" do not occur. Also, the pressure from the pressure passage 14 is always applied to the poppets, and thus the poppet-spool is axially balanced. This balanced poppet-spool can be actuated by a small operating force and, therefore, by means of low-power operating devices.

Furthermore, the seat members serve as shock absorbers for the poppet-spool. Specifically, when the poppets impact against the seat members, the seat members are elastically deformed, whereby the impact force is absorbed. In this manner, the resilient seat members prevent the valve parts from being destroyed by the impact force.

Figure 6:
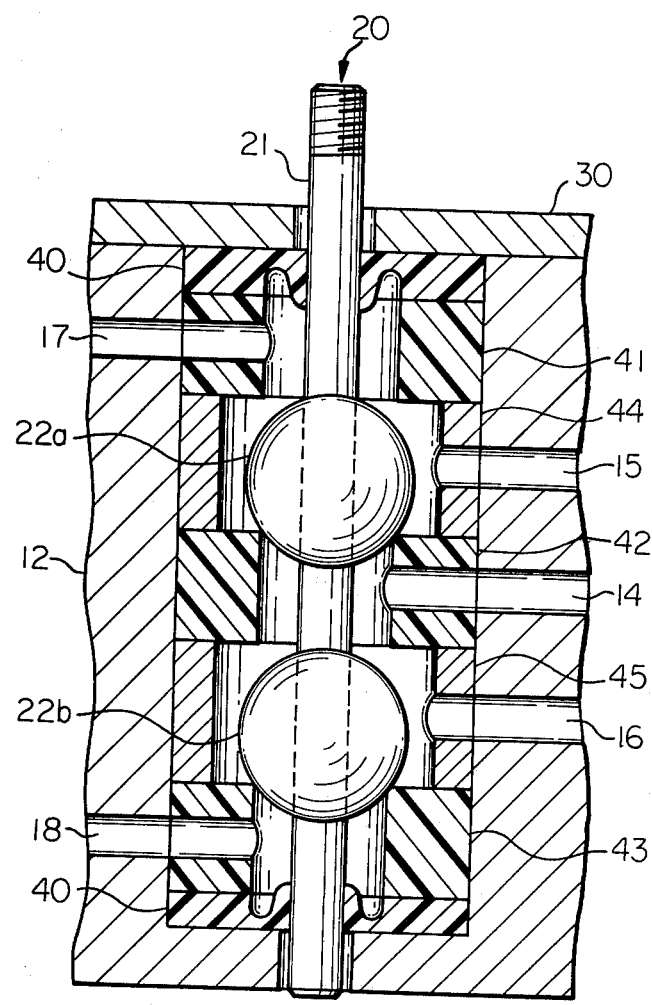
FIG. 6 is an axial sectional-view similar to FIG. 3, showing the main portion of another embodiment of the present invention.

In FIG. 6, there is shown another embodiment in accordance with the present invention. This valve also is a solenoid-operated, two-position, four-way valve. This valve is completely similar in function to the valve shown in FIG. 3, although the construction is somewhat different. Specifically, the support members 40 and the seat members 41 – 43 are somewhat different in shape from those shown in FIG. 3 and FIG. 4. The seat members 41 – 43 are the same in shape, but spacers 44 and 45 are disposed between the adjacent two seat members 41, 42, and 42, 43, respectively. The support members 40 and the seat members 41 – 43 are made of resilient and self-lubricating material, as previously described, and their peripheral surfaces are in close contact with the inner side surface of the body 12 in same manner as previously described. The spacers 44 and 45 may be made of metal. The seat members and spacers are each provided with a port which is in alignment with one of the flow-passages 14 – 18. The poppets 22a, 22b are arranged between the seat members 41, 42, and 42, 43, respectively, and come into close contact with a contact edge of the respective seat members. In this construction, it will be understood that it is not important whether the peripheral surface of the spacers 44, 45 is in contact with the body 12.

Figure 7:
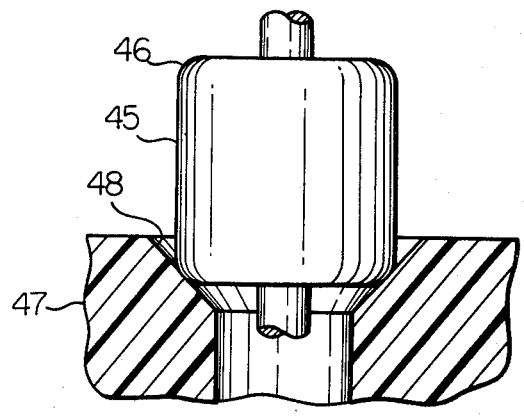
FIG. 7 and FIG. 8 illustrate other embodiments of the poppet and the seat member.
Figure 8:
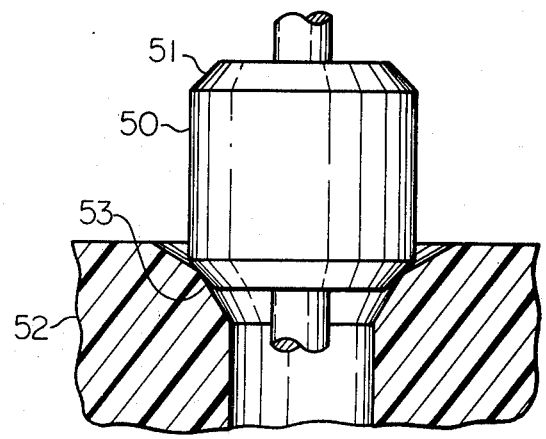

The seat member and the poppet may be made into shapes as shown in FIG. 7 and FIG. 8. Referring to FIG. 7, a poppet 45 is substantially cylindrical in shape, and has two curved contact faces 46. A seat member 47 has a tapered contact face 48. Referring to FIG. 8, a poppet 50 is also substantially cylindrical in shape, but has two tapered contact faces 51. A seat member 52 has a circular contact edge 53 similar to the contact edge 27 previously shown.

As will be understood from the above description, the directional-control valve is relatively simple in structure and reliable in operation, and also has a long life.

The invention has been described in detail with particular reference to preferred embodiments thereof, but it will be understood that variations and modifications can be effected within the spirit and scope of the invention.

What we claim is:

1. A directional-control valve for fluid-power systems, comprising:

a valve-body having a cylindrical valve chamber and a plurality of flow-passages connected to said chamber, said flow-passages having ports at said chamber which are arranged at different axial positions with respect to the axis of said chamber;

a plurality of pairs of valve-seat members disposed in said chamber, coaxial therewith, said valve-seat members being made of resilient material and each having an annular wall portion and a seat portion formed at the inner side of said wall portion, said wall portion being in close contact at its outer peripheral surface with the inner surface of the valve-body;

a poppet-spool positioned in said chamber and coaxial with said pairs of valve-seat members and including a rod and a plurality of poppets secured to said rod, each of said poppets being arranged between the seat portions of a separate pair of valve-seat members, and a pair of members disposed in said chamber at the opposite ends thereof for slidably supporting said poppet spool for axial movement, said support members being made of resilient material and each having an outer annular wall portion and an annular supporting portion formed inwardly of said outer wall portion, said outer wall portion being in close contact at its outer peripheral surface with the inner surface of the valve-body and said supporting portion being in close contact at its inner peripheral surface with the peripheral surface of said rod of the poppet-spool;

said valve-seat members and support members being supported in their positions in contact with each other at the end surfaces of their wall portions and being formed on the end surfaces of their wall portions with radially extending grooves forming flow-ports aligned with said flow-passages of the valve-body for connecting said flow-passages to the chamber.

2. A valve as claimed in claim 1, wherein said poppets are made of rigid material and said supporting portion of the support members is flexibly displaceable together with said rod of the poppet spool in the radial direction with respect to the axis of the chamber.

3. A valve as claimed in claim 1, wherein said poppets are steel balls.

4. A valve as claimed in claim 1, wherein said poppets are substantially cylindrical in shape and each has curved seat portions at the opposite ends thereof.

5. A valve as claimed in claim 1 wherein said poppets are substantially cylindrical in shape and each has tapered seat portions at the opposite ends thereof.

6. A directional control valve comprising a valve body, the walls of which define a valve chamber having a substantially uniform cross section throughout its length, said valve body having a plurality of flow-passages extending through the walls thereof into said chamber, said flow-passages being spaced apart with respect to the lengthwise direction of said chamber, a row of a plurality of valve members having central apertures, said row extending in the lengthwise direction in said chamber, said valve members being held with adjacent said valve members contacting each other, whereby said apertures are aligned and extend in the lengthwise direction of said chamber, said valve members including a resilient elastically deformable support member at each end of said row and a plurality of resilient elastically deformable seat members aligned in the lengthwise direction in said chamber, said seat members being aligned with said flow-passages and having passageways extending therethrough from the flow-passages to the apertures in the respective seat members, the outer surfaces of said support members and seat members extending into sealing contact with said chamber, apertures of said seat members being formed as valve seats, a poppet spool rod extending through said chamber in the lengthwise direction, the apertures of said support members sealingly supporting said poppet spool rod to permit lengthwise sliding movement of said rod and movement normal to the lengthwise direction due to resiliency of said support members, a plurality of poppets secured to said rod within said chamber, each poppet being positioned between the valve seats of an adjacent pair of seat members, and means for axially compressing said row of valve members.

7. A directional control valve comprising a valve body, the walls of which define a valve chamber having a substantially uniform cross section throughout its length, said valve body having a plurality of flow-passages extending through the walls thereof into said chamber, said flow-passages being spaced apart with respect to the lengthwise direction of said chamber, a row of a plurality of valve members having central apertures, said row extending in the lengthwise direction in said chamber, said valve members being held with adjacent said valve members contacting each other, whereby said apertures are aligned and extend in the lengthwise direction of said chamber, said valve members including a resilient elastically deformable support member at each end of said row and a plurality of resilient elastically deformable seat members aligned in the lengthwise direction in said chamber, said seat members being aligned with said flow-passages and having passageways extending therethrough from the flow-passages to the apertures in the respective seat members, the outer surfaces of said support members and seat members extending into sealing contact with said chamber, apertures of said seat members being formed as valve seats, a poppet spool rod extending through said chamber in the lengthwise direction, the apertures of said support members sealingly supporting said poppet spool rod to permit lengthwise sliding movement of said rod and movement normal to the lengthwise direction due to resiliency of said support members, and a plurality of poppets secured to said rod within said chamber, each poppet being positioned between the valve seats of an adjacent pair of seat members, comprising at least one resilient elastically deformable body having an outer surface sealingly contacting said chamber walls, a central aperture extending lengthwise of said valve body and having a valve seat formed therein, a pair of end surfaces engaging adjacent valve members, and a groove extending normal to said lengthwise direction in each end surface, whereby said grooves are aligned with said flow-passages to form said passageways.

8. The control valve of claim 7 wherein said valve members are comprised solely of said resilient elastically deformable support members and a plurality of said resilient bodies.

9. The control valve of claim 8 wherein said support members have grooves extending normal to said lengthwise direction and aligned with flow-passages of said valve body.

* * * * *